United States Patent
Ayazi et al.

(10) Patent No.: US 11,280,612 B2
(45) Date of Patent: *Mar. 22, 2022

(54) MEMS INERTIAL MEASUREMENT APPARATUS HAVING SLANTED ELECTRODES FOR QUADRATURE TUNING

(71) Applicant: GEORGIA TECH RESEARCH CORPORATION, Atlanta, GA (US)

(72) Inventors: Farrokh Ayazi, Atlanta, GA (US); Haoran Wen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,327

(22) Filed: Mar. 25, 2020

(65) Prior Publication Data

US 2020/0225036 A1    Jul. 16, 2020

Related U.S. Application Data

(62) Division of application No. 15/743,449, filed as application No. PCT/US2016/037186 on Jun. 13, 2016, now Pat. No. 10,634,499.

(60) Provisional application No. 62/346,855, filed on Jun. 7, 2016, provisional application No. 62/174,255, filed on Jun. 11, 2015.

(51) Int. Cl.
| | | |
|---|---|---|
| G01C 19/5747 | (2012.01) |
| G01P 15/125 | (2006.01) |
| G01P 15/097 | (2006.01) |
| G01C 19/5642 | (2012.01) |
| G01P 15/08 | (2006.01) |
| G01D 5/241 | (2006.01) |

(52) U.S. Cl.
CPC ..... *G01C 19/5747* (2013.01); *G01C 19/5642* (2013.01); *G01P 15/097* (2013.01); *G01P 15/125* (2013.01); *G01D 5/241* (2013.01); *G01P 2015/0848* (2013.01)

(58) Field of Classification Search
CPC .............. G01C 19/5656; G01C 19/574; G01C 19/5747; G01C 19/5642; G01P 15/125; G01P 15/097
See application file for complete search history.

(56) References Cited

U.S. PATENT DOCUMENTS

| | | | |
|---|---|---|---|
| 4,342,227 A | 8/1982 | Petersen et al. |
| 4,600,934 A | 7/1986 | Aine et al. |
| 4,999,735 A | 3/1991 | Wilner |
| 5,350,189 A | 9/1994 | Tsuchitani et al. |
| 5,476,007 A | 12/1995 | Nakamura |

(Continued)

FOREIGN PATENT DOCUMENTS

| | | |
|---|---|---|
| JP | H7-98328 A | 4/1995 |
| JP | 201416351 A | 1/2014 |

*Primary Examiner* — Helen C Kwok
(74) *Attorney, Agent, or Firm* — Burns & Levinson LLP; Bruce D. Jobse

(57) ABSTRACT

An inertial measurement apparatus has mechanically bendable beams that have an isosceles trapezoid cross-section. The apparatus has a resonant member having a perimeter at least partially defined by a sidewall slanted at a first angular value and at least one electrode disposed adjacent, and parallel, to the sidewall and separated therefrom by a capacitive gap.

7 Claims, 15 Drawing Sheets

(56) References Cited

U.S. PATENT DOCUMENTS

| | | | |
|---|---|---|---|
| 5,723,790 A * | 3/1998 | Andersson | G01C 19/5656 |
| | | | 257/417 |
| 5,939,632 A | 8/1999 | Moore et al. | |
| 5,945,599 A * | 8/1999 | Fujiyoshi | G01C 19/5719 |
| | | | 73/504.12 |
| 5,952,572 A | 9/1999 | Yamashita et al. | |
| 6,467,349 B1 * | 10/2002 | Andersson | G01C 19/5656 |
| | | | 73/504.14 |
| 6,806,797 B2 | 10/2004 | Kikushima | |
| 8,844,356 B2 * | 9/2014 | Ohuchi | G01C 19/56 |
| | | | 73/504.04 |
| 2002/0180563 A1 | 12/2002 | Ma et al. | |
| 2005/0150297 A1 | 7/2005 | Ayaz et al. | |
| 2006/0196267 A1 * | 9/2006 | Takahashi | G01C 19/5663 |
| | | | 73/504.12 |
| 2007/0222011 A1 | 9/2007 | Robert et al. | |
| 2010/0251818 A1 | 10/2010 | Ge et al. | |
| 2013/0283911 A1 | 10/2013 | Ayaz et al. | |
| 2014/0083210 A1 | 3/2014 | Andersson et al. | |
| 2014/0230547 A1 | 8/2014 | El-Gamal et al. | |
| 2016/0153781 A1 | 6/2016 | Blomqvist et al. | |
| 2020/0225036 A1 * | 7/2020 | Ayazi | G01P 15/097 |
| 2020/0225037 A1 * | 7/2020 | Ayazi | G01P 15/125 |

* cited by examiner

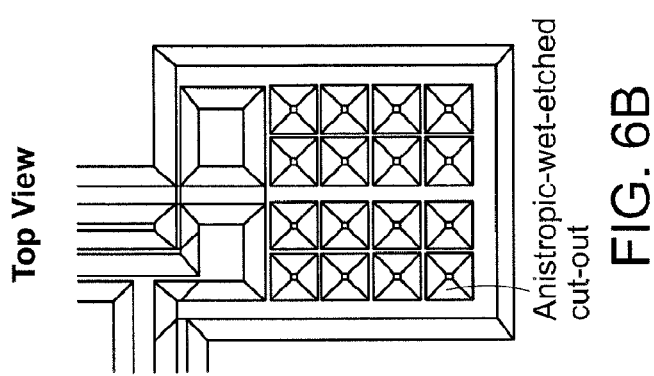
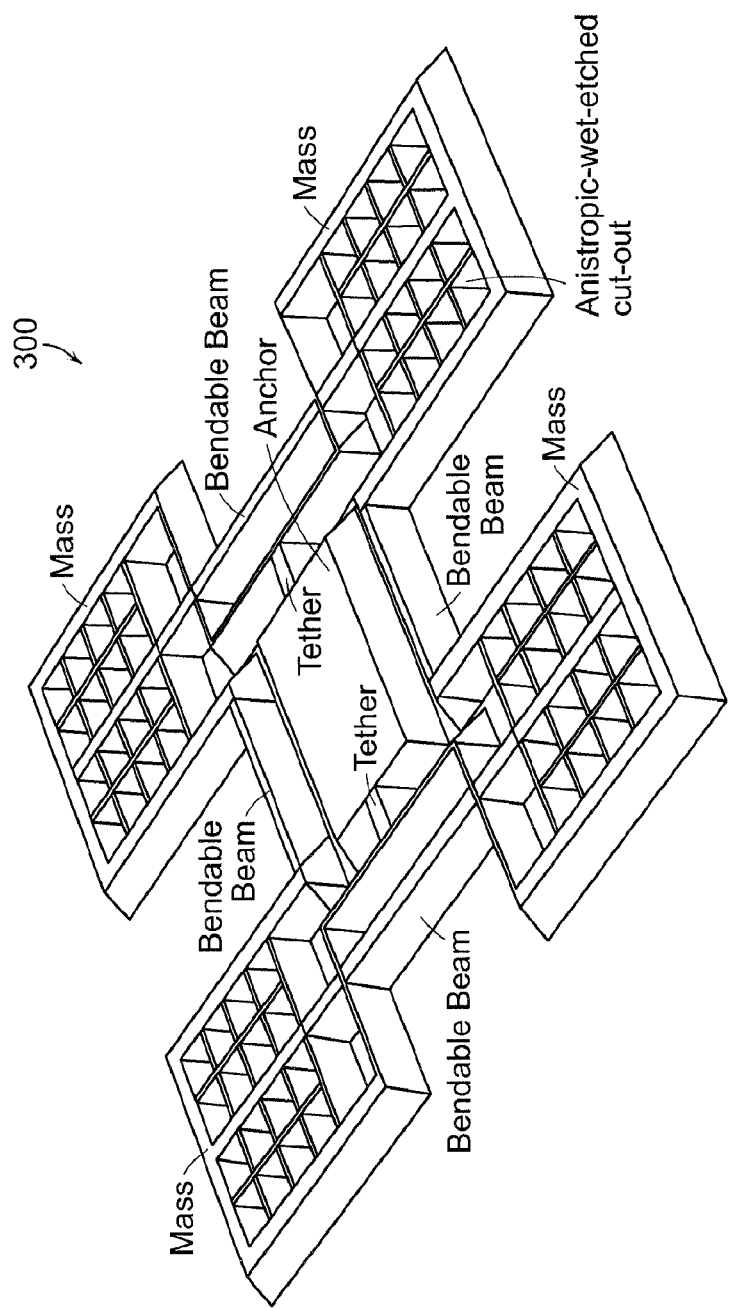
FIG. 6A
FIG. 6B

Cross-section-view including electrodes

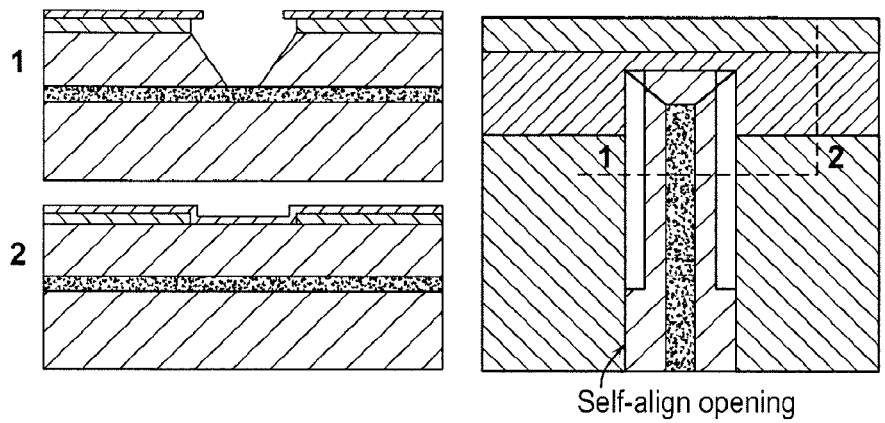
FIG. 18A
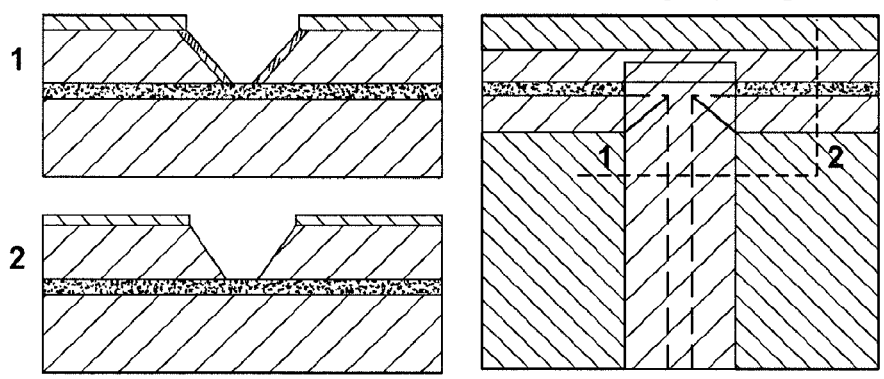
FIG. 18B
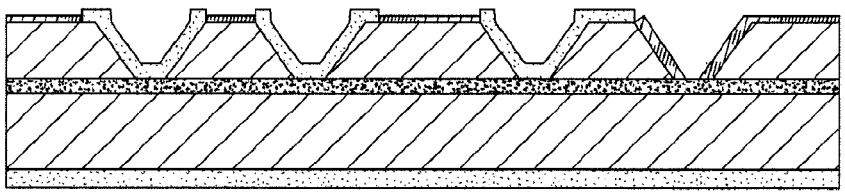
FIG. 18C
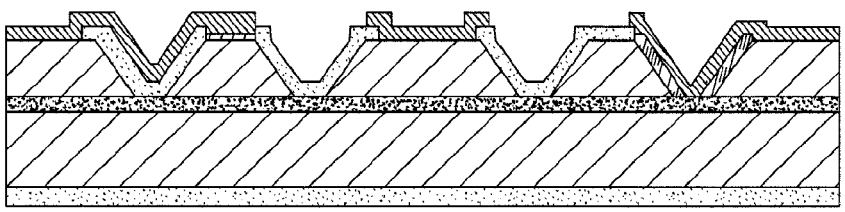
FIG. 18D
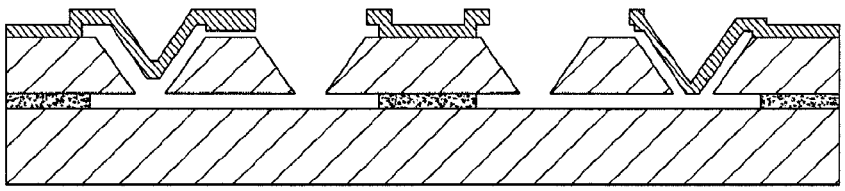
FIG. 18E
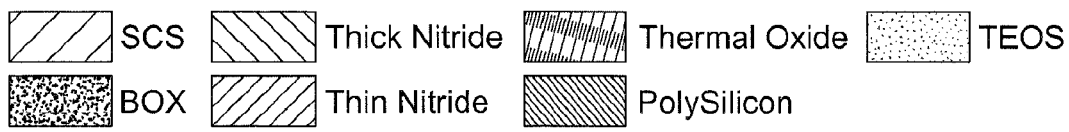

MEMS INERTIAL MEASUREMENT APPARATUS HAVING SLANTED ELECTRODES FOR QUADRATURE TUNING

CROSS-REFERENCE TO RELATED APPLICATIONS

This application is a divisional of and claims priority to U.S. Non-Provisional application Ser. No. 15/743,449, filed Jan. 10, 2018, which is a National Stage of Application Serial No. PCT/US16/37186, filed Jun. 13, 2016, and claims priority to U.S. Provisional Patent Application Ser. No. 62/346,855, filed Jun. 7, 2016 and U.S. Provisional Patent Application Ser. No. 62/174,255, filed Jun. 11, 2015, the contents of which are incorporated by reference herein in their entirety for all purposes.

GOVERNMENT RIGHTS

This invention was made with U.S. government support under Contract Number N660011-11-C-4176 awarded by the U.S. Navy. The government has certain rights in the invention.

FIELD OF THE INVENTION

The disclosure relates to a mode-matched MEMS (Micro-Electro-Mechanical Systems) inertial measurement apparatus.

BACKGROUND OF THE INVENTION

Considering the commercial success of MEMS-based accelerometers, MEMS gyroscopes are believed to be the next trending application in the MEMS industry. MEMS gyroscopes offer self-contained rotation measurement of an object. Even after years of development, however, the MEMS gyroscope market is still limited to a small portion of consumer, automotive and low-end military applications. It is believed that what keeps MEMS gyroscopes from a wide range of consumer markets is their high cost/performance ratio. While a low-cost MEMS gyroscope with a compromised, or lower level, performance has proven successful for some applications, at the same time, the lower performance point has kept such gyroscopes from much more potential applications such as, for example, personal navigation or dead reckoning applications.

The application of a MEMS gyroscope to enable miniaturized inertial navigation systems (INS) for personal navigation requires tri-axial rotation sensing. Different types of MEMS yaw gyroscopes have demonstrated promising performance, however, developing high-performance out-of-plane pitch and roll gyroscopes is known to be very challenging.

The performance of a gyroscope can be evaluated through its signal to noise ratio (SNR). The SNR of a gyroscope can be increased by noise reduction and improvement in rate sensitivity. One approach to achieving increased sensitivity is through mode-matched operation where the drive and sense modes having the exact same resonance frequency. When mode-matched, the Coriolis force excites the sense mode at its resonance frequency, leading to a Q-amplified sense response. However, perfect mode-matching may not be possible due to cross-coupling of resonance modes, i.e., quadrature error, caused by fabrication non-idealities. Quadrature error breaks the eigenvalue-degeneracy of the equations of motion, resulting in a veering phenomenon that appears as a minimum obtainable frequency-split between the drive and sense modes of a gyroscope. In addition, quadrature error provides a path through which drive-loop noise is carried to the sense mode and becomes a major noise contributor in the sense output signal.

Considering both effects, quadrature error significantly degrades the output SNR and attempts have been made to minimize it in order to achieve better performance in a MEMS gyroscope. One known approach is electrostatic quadrature tuning in a mode-matched yaw gyroscope. However, in out-of-plane gyroscopes that are used for pitch and roll detection, and fabricated using wafer level processing and DRIE techniques, mode alignment or quadrature tuning electrodes are typically unavailable, which makes quadrature error the biggest obstacle in realizing high-performance pitch and roll gyroscopes.

In addition, the relatively high cost of high-performance MEMS gyroscopes is a result of their complexity and limited manufacturability. As above, in high-performance gyroscopes, mode-matched operation is required for a large SNR. Based on their operation frequency, mode-matched gyroscopes can be sorted into low frequency gyroscopes and high frequency gyroscopes. The sensitivity and noise performance parameters of low frequency gyroscopes rely on a large proof-mass and a large drive amplitude. As a result, low frequency gyroscopes are large in size and sensitive to shocks and linear accelerations. On the other hand, high frequency gyroscopes take advantage of high frequency resonant modes with high quality factors. High-frequency gyroscopes are smaller in size and have better shock resistance, which makes them ideal for a variety of applications, however, high frequency gyroscopes often involve complex fabrication processes. In addition, small fabrication imperfections can cause problems like frequency mismatch and cross-coupling (quadrature), which highly limit their yield and performance. This is true especially for pitch and roll gyroscopes, where both planar and thickness variations play important roles.

Accordingly, a need exists for a MEMS gyroscope design that results in improved performance over known MEMS gyroscopes and that can be manufactured at a cost that makes the device cost-competitive for high volume consumer electronics products.

SUMMARY

According to one aspect of the disclosure, a resonance structure comprises a plurality of masses connected to one another by a plurality of bendable beams. The resonance structure is coupled to a substrate by an anchor that is located at a center of the resonance structure. The resonance structure also has two operational resonance modes: in-plane and out-of-plane.

In another aspect of the disclosure, a Coriolis vibratory pitch/roll gyroscope comprises a resonance structure having four masses coupled together by four bendable beams. The resonance structure has two operational resonance modes: in-plane and out-of-plane. In addition, the resonance structure is anchored to a substrate by four anchors with a respective anchor provided at the center of each respective mass. Thus, the mass takes the form of a frame surrounding the anchors.

According to one aspect of the disclosure, an inertial measurement apparatus comprises a resonant member having a perimeter at least partially defined by a sidewall slanted at a first angular value relative to a first plane in which the resonant member exists; and at least one electrode disposed adjacent the sidewall and separated therefrom by a capacitive gap, at least a portion of the at least one electrode being slanted relative to the first plane in which the resonant member exists by a second angular value substantially the same as the first angular value. In one embodiment, the first angular value is defined by (111) and (100) crystal planes of the sidewall to be 54.74° relative to the first plane.

In one embodiment, a plurality of electrodes may be disposed adjacent the resonant member sidewall and each electrode separated therefrom by a respective capacitive gap. At least a portion of each of the plurality of electrodes are slanted relative to the first plane in which the resonant member exists by an angular value substantially the same as the first angular value.

In another embodiment, at least one quadrature cancellation electrode is disposed adjacent, and parallel, to a first face of the resonant member, wherein a capacitive gap is defined between the at least one quadrature electrode and the first face of the resonant member.

According to another aspect of the disclosure, an inertial measurement apparatus comprises a resonant mass defining a plurality of rectangular sections interconnected by a plurality of mechanically deformable beams; and an anchor coupling the resonant mass to a substrate, wherein at least one of the deformable beams has a trapezoidal cross-sectional shape with a first face at a first angle.

In one embodiment, the at least one deformable beam may be formed by anisotropic wet etching of single crystal silicon. The at least one deformable beam may comprises an isosceles trapezoid cross-section shape.

In another embodiment, the inertial measurement apparatus further comprises a plurality of electrodes disposed adjacent the resonant mass and separated therefrom by a capacitive transduction gap, wherein at least one electrode is disposed along a slanted surface of the resonant mass.

In another aspect of the disclosure, an article of manufacture comprises a resonant mass formed of a semiconductor material and defining a plurality of rectangular sections interconnected by a plurality of mechanically deformable beams, at least one of the deformable beams having a trapezoidal cross-sectional shape. The at least one deformable beam, in another embodiment, has the cross-sectional shape of an isosceles trapezoid.

In another aspect of the disclosure, an inertial measurement apparatus comprises a resonant member having a perimeter at least partially defined by a sidewall having a first angular value relative to a first plane in which the resonant member exists; and at least one electrode disposed adjacent the sidewall and separated therefrom by a capacitive gap, at least a portion of the electrode being parallel to the sidewall of the resonant member, wherein the first plane has a respective angular value of 0° and the first angular value is greater than 30° but less than 60° relative to the first plane.

In one embodiment, a plurality of electrodes is disposed adjacent the sidewall of the resonant member and each electrode is separated therefrom by a respective capacitive gap and at least a portion of each of the plurality of electrodes is parallel to the sidewall of the resonant member, in another embodiment.

In one aspect of the disclosure, a method of manufacturing an inertial measurement MEMS semiconductor apparatus comprises: depositing and patterning a first nitride layer to define trench patterns with convex corners; depositing and patterning a second nitride layer to partially cover the trench patterns and cover the convex corners; performing a first anisotropic-wet-etching of single-crystal silicon (SCS) to form trenches at an uncovered region with edges aligned to the first nitride layer; performing wet oxidation of the SCS to form a thick thermal oxide layer; blank etching nitride to remove the second nitride layer; performing a second anisotropic-wet-etching of the SCS to form anisotropic-wet-etched trenches aligned to the first nitride layer; removing nitride and oxide with blank etch, then depositing and patterning TEOS; wet oxidizing the SCS to form and pattern a thin sacrificial oxide layer; depositing and patterning LPCVD poly-silicon to form horizontal and slanted electrodes; and isotropic wet-etching oxide to release a resonant member.

In another aspect of the disclosure, a method of manufacturing an inertial measurement MEMS semiconductor apparatus comprises: depositing and patterning a first LPCVD nitride layer to define trench shapes without convex corners; performing a first anisotropic etch single-crystal silicon (SCS) to form trenches defined by a pattern of the first LPCVD nitride layer; depositing and patterning a second LPCVD nitride layer to expose SCS at an intersection of orthogonal trenches; performing a second anisotropic wet etch of the SCS to form convex corners at the intersection of the orthogonal trenches of the second nitride layer; blank etching the second nitride layer; depositing and patterning tetraethyl orthosilicate (TEOS); performing wet oxidation of the SCS to form a sacrificial thin oxide layer; patterning the sacrificial thin oxide layer; depositing and patterning LPCVD poly-silicon to form horizontal and slanted electrodes; and isotropic wet etching oxide to release a resonant member.

BRIEF DESCRIPTION OF THE DRAWINGS

Various aspects of at least one embodiment of the present invention are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The Figures are provided for the purposes of illustration and explanation and are not intended as a definition of the limits of the invention. In the Figures:

FIGS. 6(a), 6(b) and 7 depict a resonant structure in accordance with an embodiment of the present invention;

FIGS. 18(a)-18(e) depict a method of manufacturing of the resonance structure of FIGS. 1-6;

DETAILED DESCRIPTION

Figure 1:
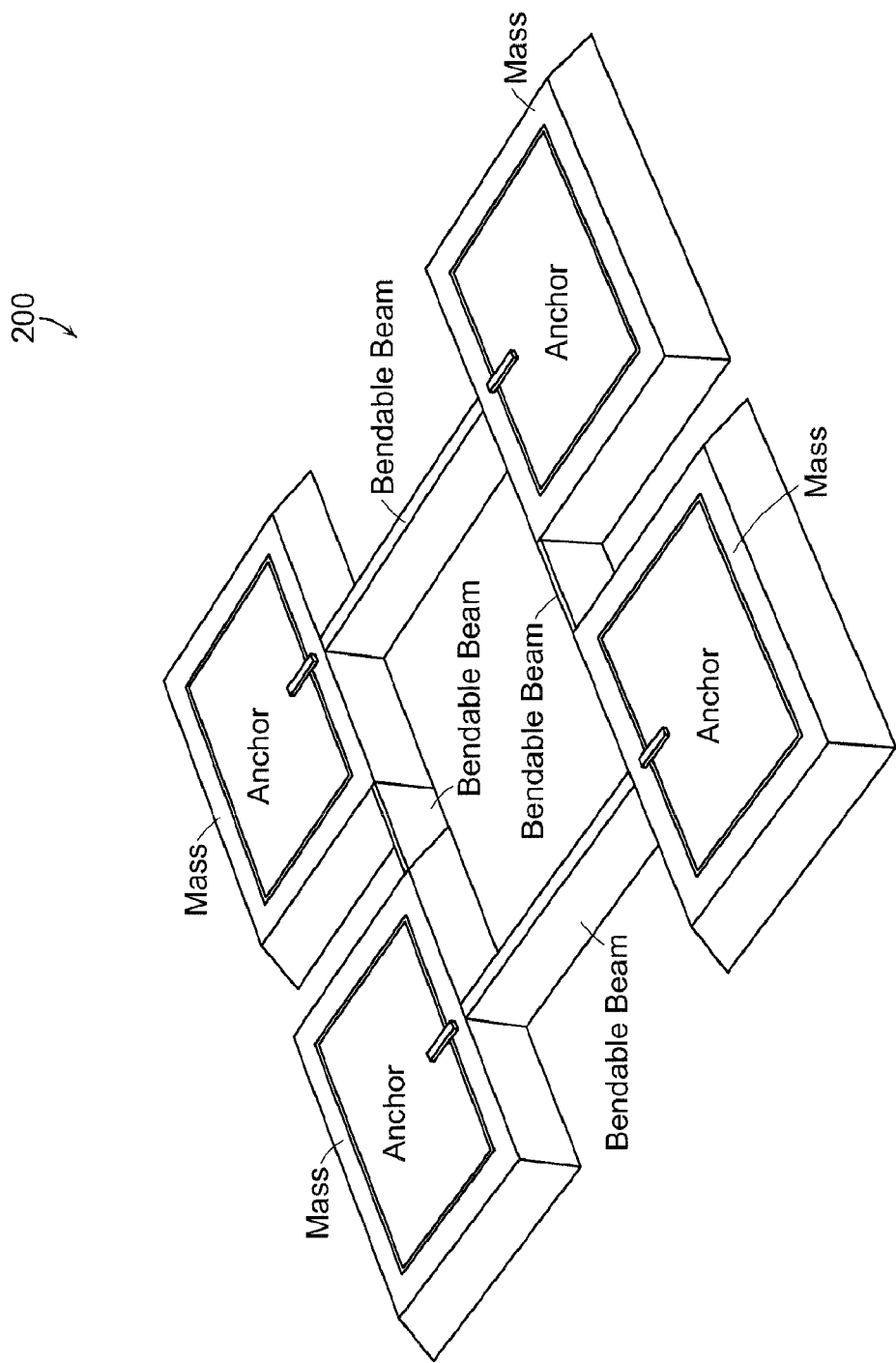
FIGS. 1-5 depict a resonant structure in accordance with an embodiment of the present invention.
Figure 2:
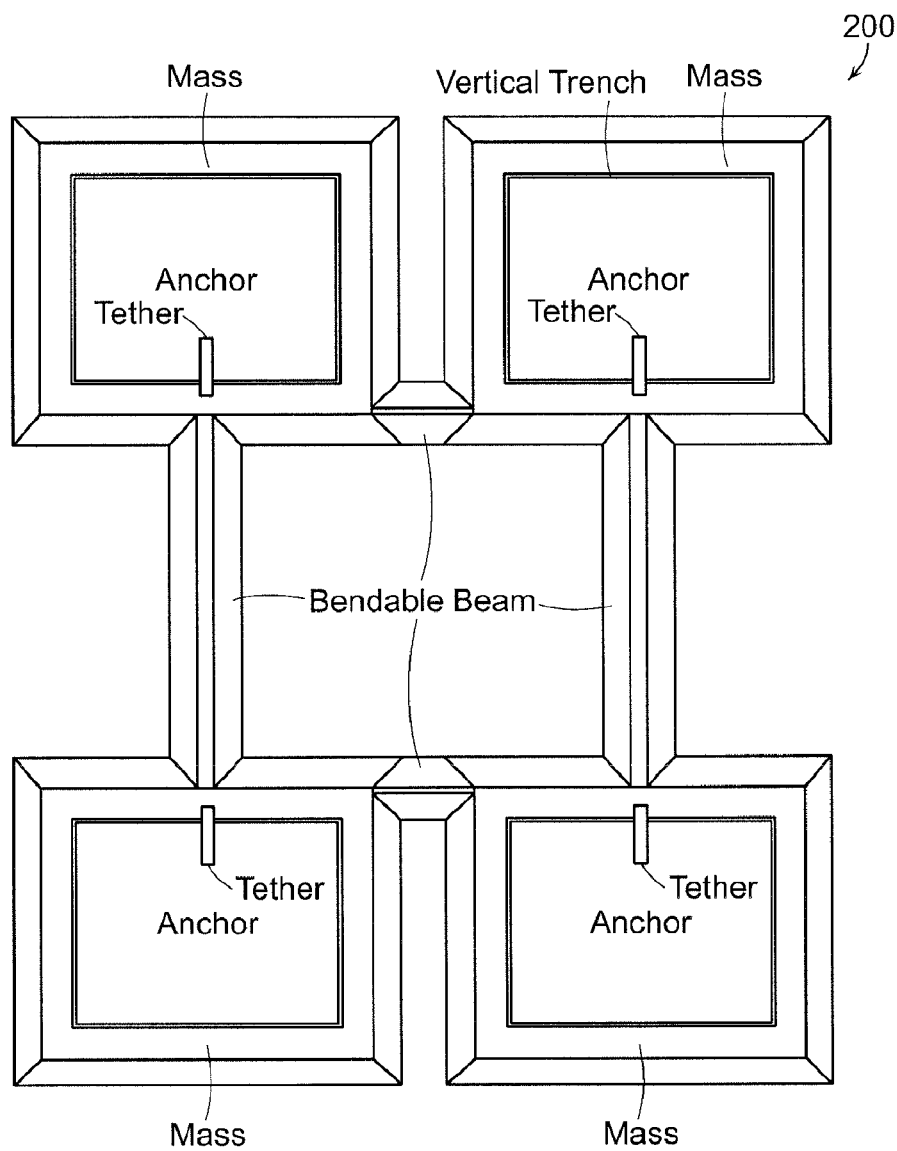

This application is a divisional of and claims priority to U.S. Non-Provisional application Ser. No. 15/743,449, filed Jan. 10, 2018, which is a National Stage of Application Serial No. PCT/US16/37186, filed Jun. 13, 2016, and claims priority to U.S. Provisional Patent Application Ser. No. 62/346,855, filed Jun. 7, 2016 and U.S. Provisional Patent Application Ser. No. 62/174,255, filed Jun. 11, 2015, the contents of which are incorporated by reference herein in their entirety for all purposes.

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As discussed in more detail below, approaches to the thickness and process variation problems found in mode-matched pitch (roll) gyroscopes with anisotropic silicon wet etching are presented. Designs based on this method are much more robust to thickness variations. In addition, the electrostatic correction of quadrature error in pitch/roll gyroscopes is presented.

Further, slanted electrodes along wet-etched (111) (Miller Index) surfaces are described that are used for efficient quadrature nulling in an out-of-plane pitch and roll gyroscope. In addition, anisotropic-wet-etching can be used for the fabrication of the entire vibrating body. By doing so, frequency split between drive and sense modes is insensitive to thickness variations of the SOI device layer and also eliminate the use of expensive DRIE in device fabrication, reducing both process variation dependency and fabrication cost of the gyroscope.

As is known, anisotropic wet etching, for example, KOH (potassium hydroxide) or TMAH (Tetramethylammonium hydroxide) etching, of (100) silicon wafer exposes slanted sidewalls defined by (111) planes. Such slanted sidewalls offer a well-defined relation between in-plane and out-of-plane degrees of freedom of the mechanical structure. Advantageously, both the thickness variation problem and the mode cross-coupling problem can be effectively addressed by taking advantage of this relation, as will be described in more detail below.

Device layer thickness variation is one of the common imperfections in SOI (Silicon on Insulator) wafers. The variation is ±0.5 µm for standard SOI wafers and in the situation where a heavily doped wafer is needed, this variation can even be a few micrometers. Although wafers with smaller thickness variations are available, they are much more expensive and not suitable for large volume commercial purposes.

In conventional designs, the in-plane mode frequency is normally independent of device thickness and the out-of-plane mode frequency has a linear dependence on thickness, so device thickness variations lead to a frequency split between the two resonant modes. This split can be large for high frequency designs thus making the modes unmatchable.

In accordance with one embodiment described below, in a mode-matched pitch/roll gyroscope, a pair of non-degenerate in-plane and out-of-plane modes are designed to have the same resonant frequency with, in one embodiment, a thickness insensitive gyroscope (TIG) design where anisotropic wet etching is used to avoid the large frequency split caused by thickness variations.

Referring now to FIGS. 1-5, in one embodiment of the present invention, a Coriolis vibratory pitch/roll gyroscope comprises a resonance structure 200 having, in this example, four masses coupled together by four bendable beams. The resonance structure 200 has two operational resonance modes: in-plane and out-of-plane and these will be discussed in more detail below. In addition, the resonance structure is anchored to a substrate (not shown) by four anchors with a respective anchor provided at the center of each respective mass. Thus, the mass takes the form of a frame surrounding the anchors, as shown in the top-view perspective of FIGS. 2 and 5, where, in FIG. 5, the anchors are not shown.

Figure 3B:
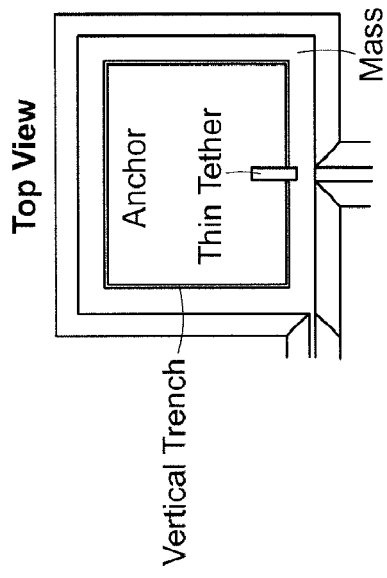
Figure 4:
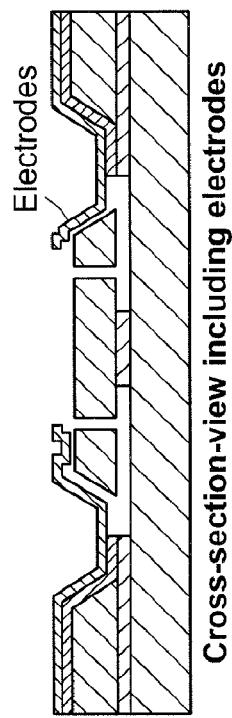
Figure 3A:
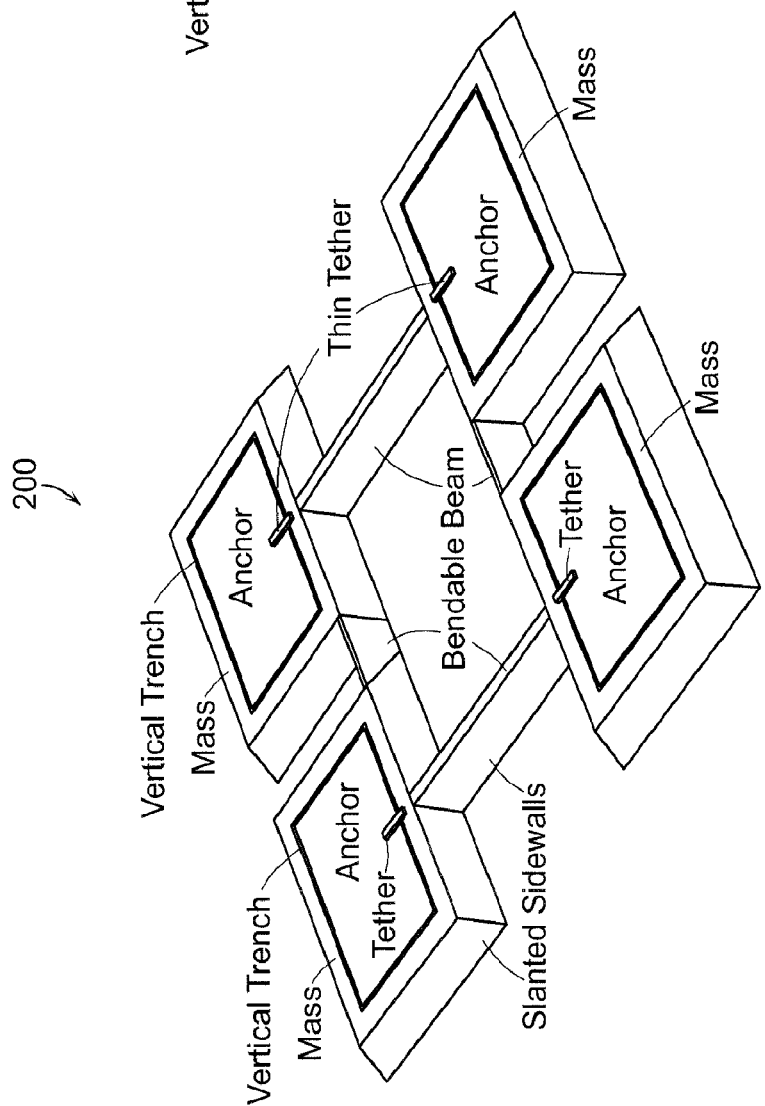
Figure 5:
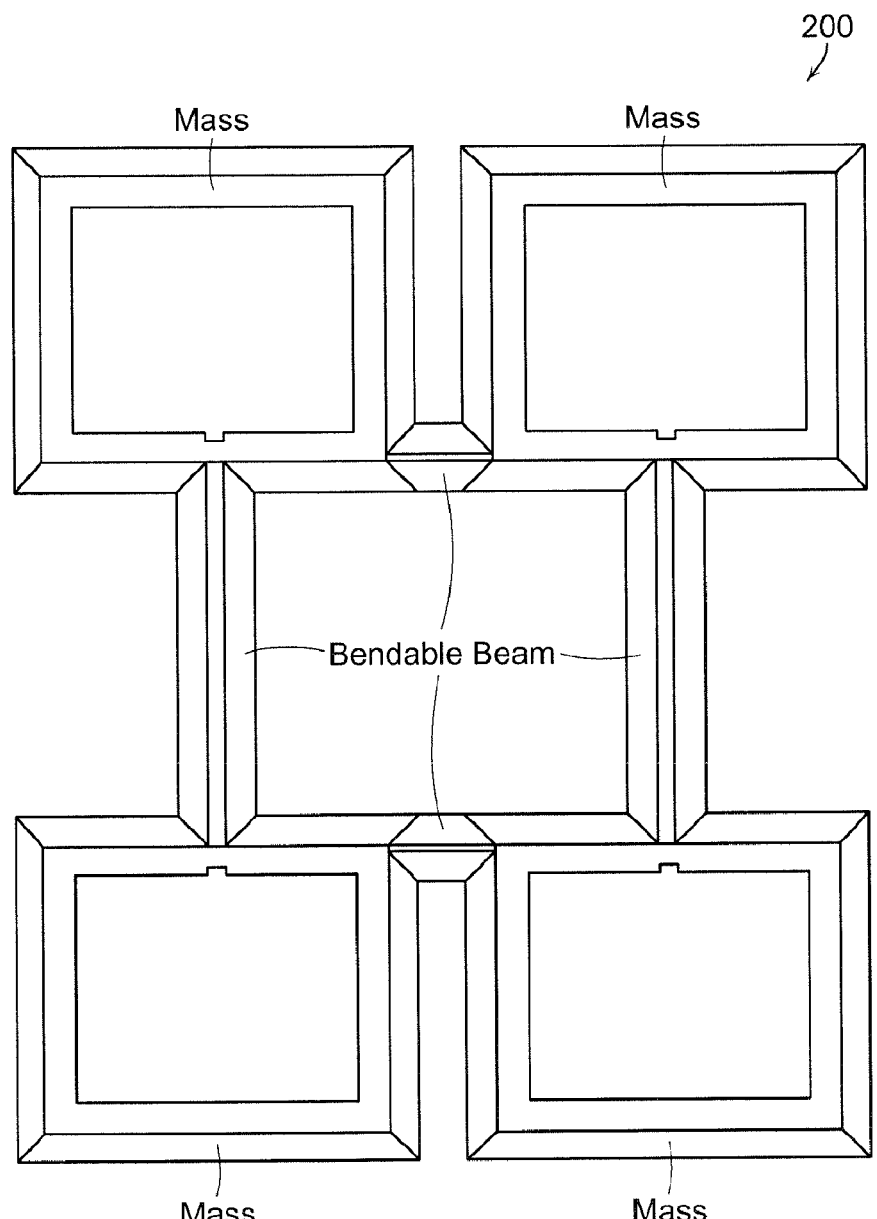

Each anchor is coupled to the respective mass by a tether but otherwise separated from the mass by a vertical trench running around a periphery of the anchor, as shown in FIGS. 3(a) and 3(b). In addition, while the masses and anchors in FIGS. 3(a) and 3(b) are shown as being symmetric to one another, i.e., the same shape, various modifications to this design are contemplated. In one non-limiting example, the mass and respective anchor may not be the same, e.g., a square anchor and a rectangular mass or vice-versa.

In one embodiment, the resonance structure 200 is formed by a combination of silicon anisotropic wet etching and DRIE, where the trapezoid beam and slanted sidewalls are formed during anisotropic wet etching step(s) and vertical trenches are formed during DRIE step(s). In this approach, the thin tethers with vertical sidewalls can be formed to connect the resonance structure to the anchor(s).

Figure 7:
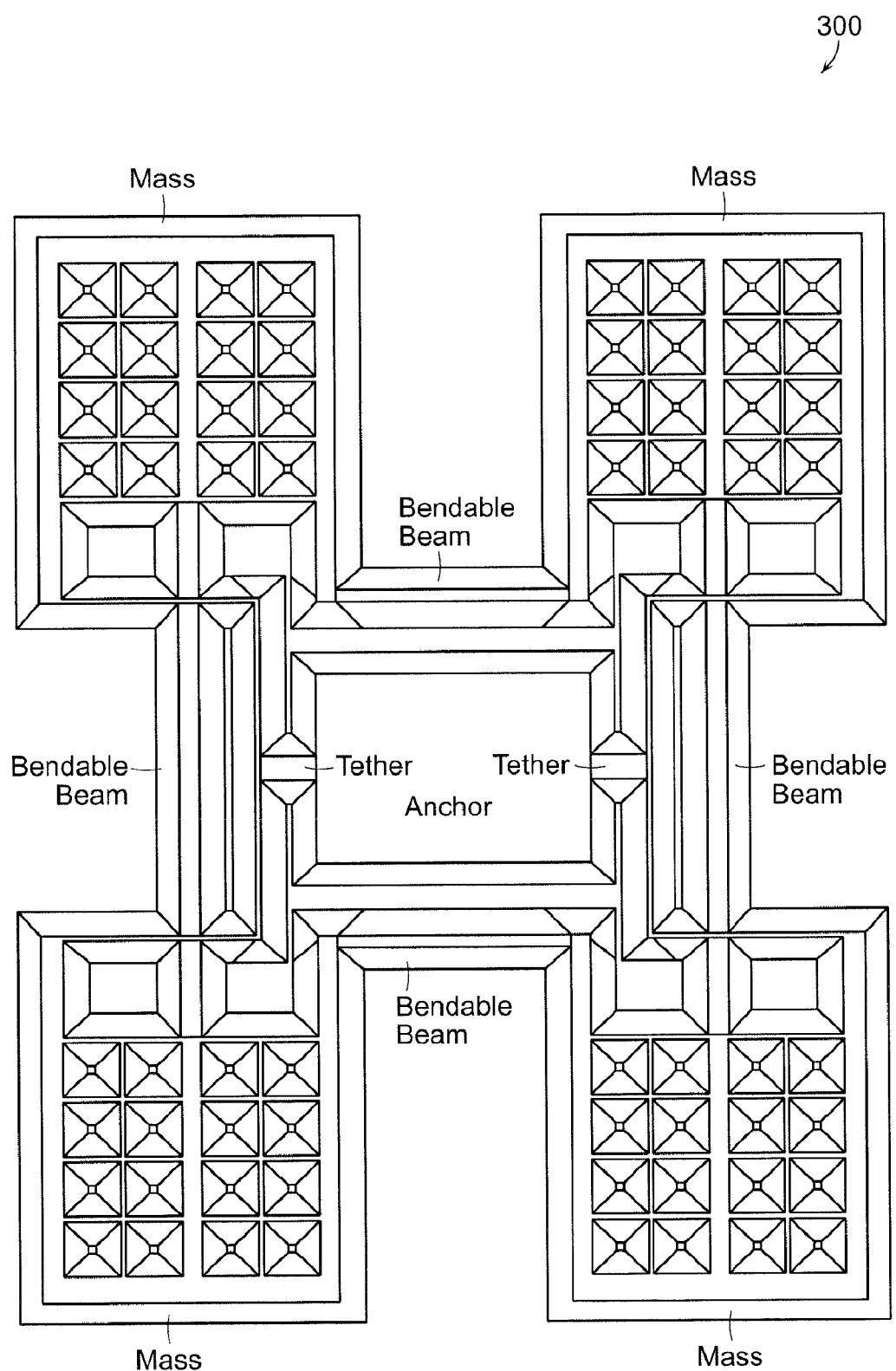

Referring now to FIGS. 6(a), 6(b) and 7, in another embodiment of the present invention, a resonance structure 300 comprises a plurality of masses connected to one another by a plurality of bendable beams. The resonance structure 300 is coupled to a substrate by an anchor that is located at a center of the resonance structure. The anchor is coupled to the resonance frame by tethers. The resonance structure 300 also has two operational resonance modes: in-plane and out-of-plane.

Further, as shown in FIGS. 6(a), 6(b) and 7, the masses of the resonance structure 300 may be blocks comprising cut-outs for device releasing purposes, as known to those of ordinary skill in the art. Depending on the fabrication method used, the cut-outs can have the form of: (1) a reverse-pyramid shape defined by silicon anisotropic wet-etching, (2) vertical releasing holes/slits defined by silicon DRIE or (3) other shapes defined by other etching technology as known to those of ordinary skill. Alternatively, the masses may be configured as an "open frame," as per the resonance frame 200.

In one embodiment, the resonance structure 300 is formed by silicon anisotropic wet etching only. The elimination of DRIE reduces the fabrication cost, however, the device only has slanted sidewalls. In this approach, tether structures with trapezoid cross-sections connect the resonance structure to the anchor(s).

The resonance structures 200, 300 have similar Coriolis vibratory pitch/roll features that are advantageously applied to gyroscope design. Each has a resonance structure that consists of four masses connected by four bendable beams and two operational resonance modes, i.e., in-plane and out-of-plane.

Figure 9:
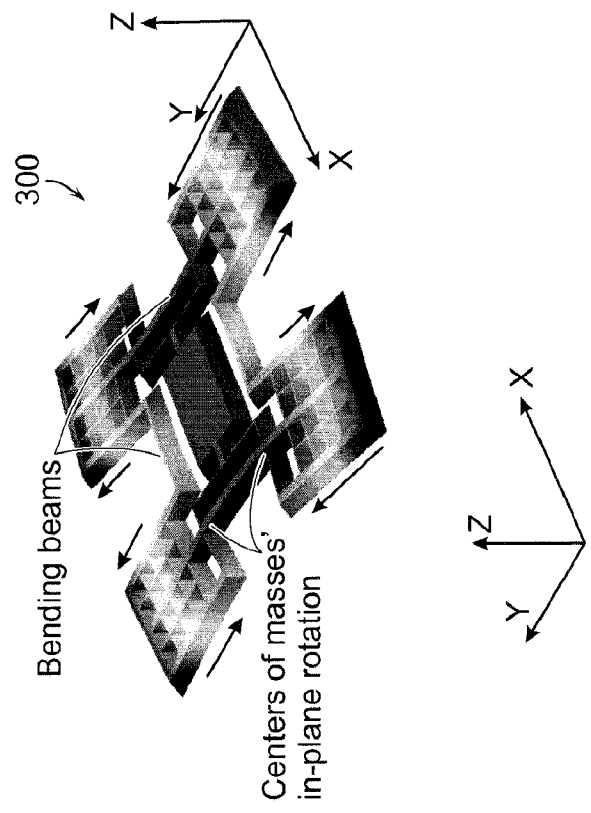
FIGS. 8 and 9 depict the in-plane rotation of the resonant structures shown in FIGS. 1-7.
Figure 8:
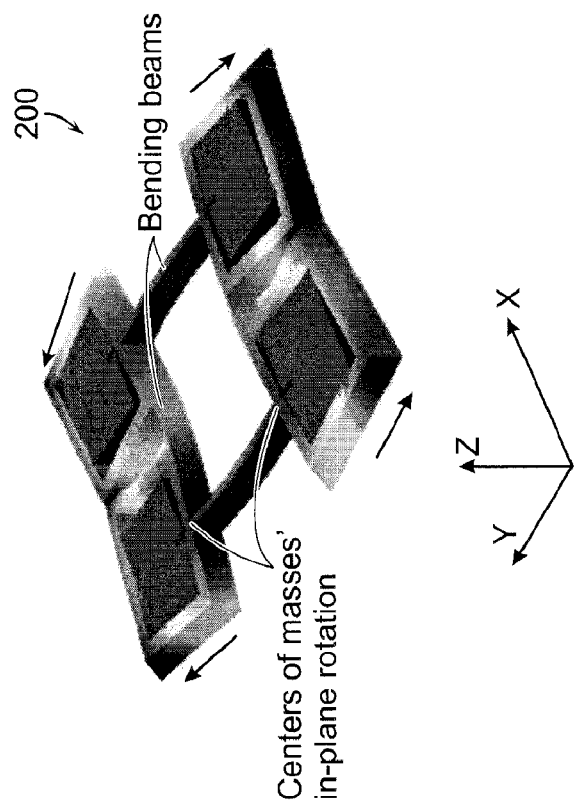

In the in-plane mode, the beams bend in in-plane directions, causing each mass to rotate in-plane around connecting points to one pair of the beams. As shown in FIGS. 8 and 9, in the in-plane mode, the masses move in the X-Y plane.

Figure 11:
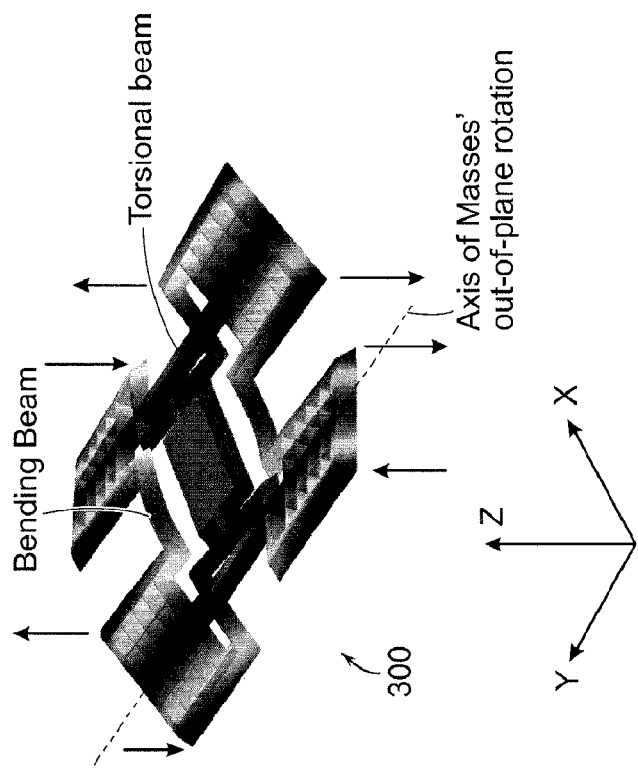
FIGS. 10 and 11 depict the out-of-plane rotation of the resonant structures shown in FIGS. 1-7.
Figure 10:
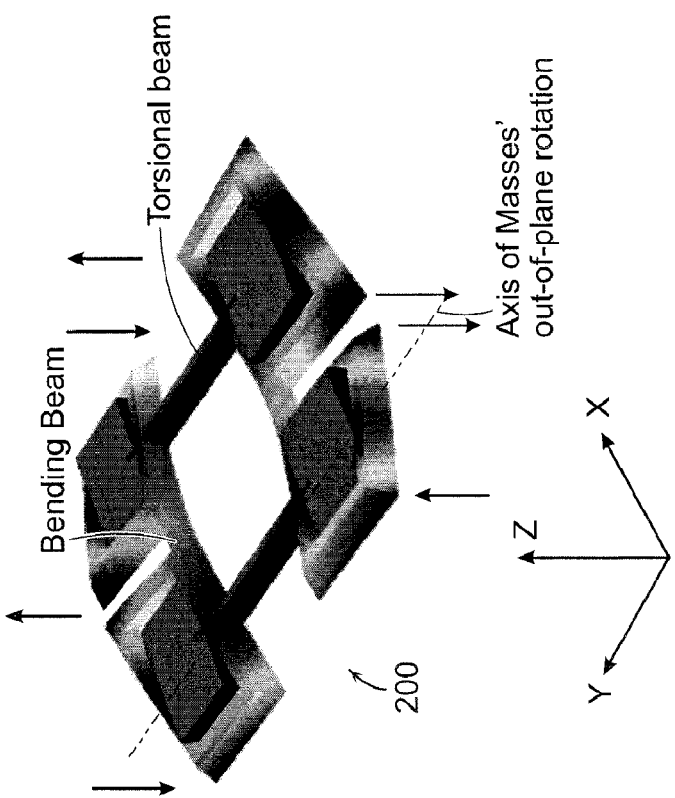

In the out-of-plane mode, one pair of beams bends in out-of-plane direction and the other pair of beams deforms torsionally, causing the masses to rotate out-of-plane around axes coinciding with the torsional beams. Thus, as shown in FIGS. 10 and 11, the masses displace along the Z-axis.

The two resonance mode are Coriolis coupled to one another. In one embodiment, one of the modes can serve as the drive mode of the gyroscope and the other mode will be the sense mode of the gyroscope.

In each of the resonance structures 200, 300, the bendable beams can have trapezoid cross-sections and the masses can have slanted sidewalls. Advantageously, each design leverages the benefits of highly-reduced thickness dependency of frequency-split between the two resonance modes and achieves quadrature tuning by implementing slanted electrodes along the slanted sidewalls of the resonance structure, as described below.

A general MEMS gyroscope with stiffness non-ideality can be represented by a two-degree-of-freedom spring-mass-damper system with the equations of motion described by:

$$m\begin{bmatrix}\ddot{q}_1\\\ddot{q}_2\end{bmatrix}+\begin{bmatrix}\dot{q}_1\\\dot{q}_2\end{bmatrix}\begin{bmatrix}b_{11} & 2\lambda m\Omega\\-2\lambda m\Omega & b_{22}\end{bmatrix}+\begin{bmatrix}q_1\\q_2\end{bmatrix}\begin{bmatrix}k_{11} & k_{12}\\k_{21} & k_{22}\end{bmatrix}=\begin{bmatrix}F_d\\0\end{bmatrix}, \quad (1)$$

where $q_1$, $q_2$, $k_{11}$, $k_{22}$ are displacements and effective stiffness of the drive and sense modes, respectively;

$k_{12}$ and $k_{21}$ are cross-coupling spring constants, causing quadrature errors. The eigenfrequency of Eqn. (1) is given by:

$$\omega_{1,2}=\sqrt{\frac{1}{2m}\left(k_{11}+k_{22}+2k_{12}\pm\sqrt{(k_{11}-k_{22})^2+4k_{12}^2}\right)} \quad (2)$$

For an ideal mode-matched gyroscope, the stiffness matrix $K_m$ is a scalar matrix with $k_{11}=k_{22}=k$ and $k_{12}=k_{21}=0$, which gives degenerate eigenfrequencies $\omega_1=\omega_2=(k/m)^{1/2}$. In practice, $k_{11}\neq k_{22}$ and $k_{12}=k_{21}\neq 0$, which results in divergence of frequencies. To compensate for this non-ideality, electrostatic tuning is usually used. In capacitive transduction, electrical energy stored in the capacitor between a vibrating structure and a fixed electrode is a function of $q_1$ and/or $q_2$, which gives rise to an electrostatic stiffness matrix:

$$K_e=-\begin{bmatrix}\frac{\partial^2 U_e}{\partial q_1^2} & \frac{\partial^2 U_e}{\partial q_1\partial q_2}\\\frac{\partial^2 U_e}{\partial q_1\partial q_2} & \frac{\partial^2 U_e}{\partial q_2^2}\end{bmatrix}=-\frac{V^2}{2}\begin{bmatrix}\frac{\partial^2 C(q_1,q_2)}{\partial q_1^2} & \frac{\partial^2 C(q_1,q_2)}{\partial q_1\partial q_2}\\\frac{\partial^2 C(q_1,q_2)}{\partial q_1\partial q_2} & \frac{\partial^2 C(q_1 q_2)}{\partial q_2^2}\end{bmatrix} \quad (3)$$

The overall stiffness of a gyroscope is the superposition of $K_m$ and $K_e$ from all electrodes. By changing tuning voltages at different electrodes, the overall stiffness can be adjusted.

Figure 12:
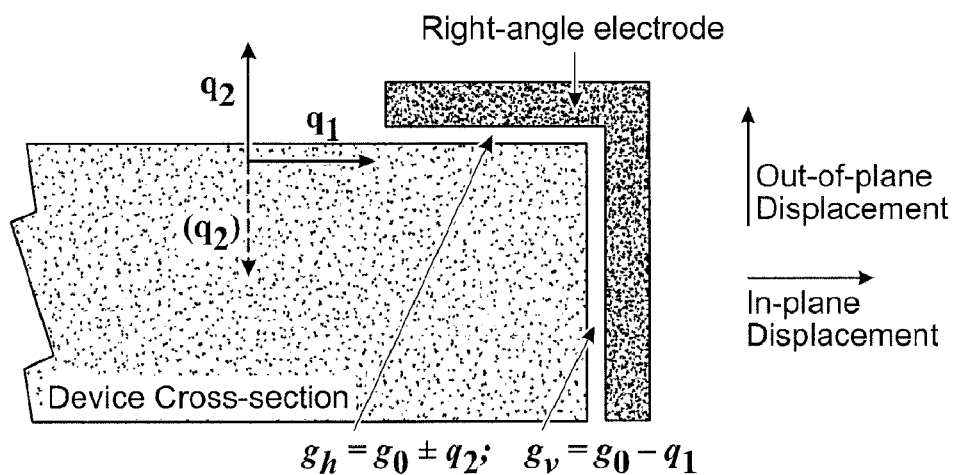
FIG. 12 depicts a known right-angle electrode.

Electrostatic tuning in pitch and roll gyroscopes using in-plane and out-of-plane modes, however, has limited efficiency. Conventional gyroscopes fabricated with directional etching allow only vertical and horizontal electrodes, as shown in FIG. 12. Vertical capacitance has negligible change under out-of-plane displacements and horizontal capacitance has negligible change under in-plane displacements. Consequently, any electrode combination gives a capacitance as a separable function of in-plane and out-of-plane displacements, namely, $C(q_1,q_2)\approx C_1(q_1)+C_2(q_2)$. For example, in a right-angle electrode, the electrical energy, neglecting the small contribution from a fringing field, is given by:

$$U_e \approx \frac{V^2}{2}(C_{vertical}+C_{horizontal})=\frac{\varepsilon_0 V^2}{2}\left(\frac{A_h}{g_h}+\frac{A_v}{g_v}\right) \quad (4)$$

In order to achieve efficient tuning, small gap sizes and large transduction areas are generally used for the electrodes. Compared to the gap size, the area has negligible change under resonant deformations. Assuming, without the loss of generality, that both horizontal and vertical capacitors have the same rest gap size go, a series expansion of the electrical energy gives:

$$U_e=\frac{\varepsilon_0 V^2}{2}\left(\frac{A_h}{g_0-q_1}+\frac{A_v}{g_0\mp q_2}\right) \quad (5)$$
$$\approx \frac{\varepsilon_0 V^2}{2g_0}\left[A_h+A_v+A_h\frac{q_1}{g_0}\pm A_v\frac{q_2}{g_0}+A_h\left(\frac{q_1}{g_0}\right)^2+A_v\left(\frac{q_2}{g_0}\right)^2+\ldots\right]$$

According to (3), the corresponding $K_e$ is diagonal:

$$K_e=\begin{bmatrix}k_{e11} & k_{e12}\\k_{e21} & k_{e22}\end{bmatrix}=\frac{-\varepsilon_0 V^2}{g_0^3}\begin{bmatrix}A_h & 0\\0 & A_v\end{bmatrix}, \quad (6)$$

which means in-plane or out-of-plane frequency can be tuned independently, but no quadrature tuning is achieved.

Figure 13:
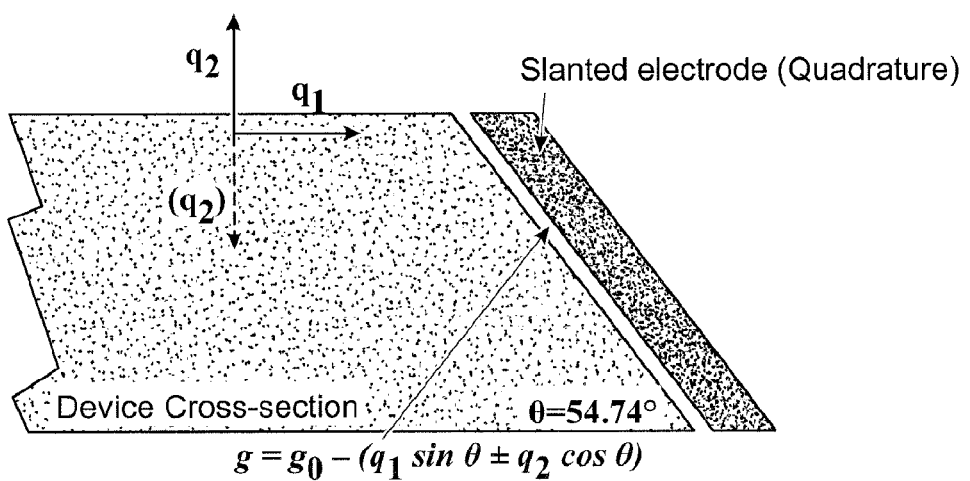
FIG. 13 depicts a slanted quadrature electrode in accordance with an embodiment of the present invention.

In contrast, anisotropic wet etching of (100) SCS forms slanted sidewalls bounded by (111) crystal planes, which offers a well-defined relation between in-plane and out-of-plane degrees of freedom. Slanted electrodes along wet-etched (111) surfaces have capacitive gaps affected by both in-plane and out-of-plane motions, as shown in FIG. 13. The energy stored in a slanted electrode is:

$$U_e = \frac{\varepsilon_0 A V^2}{2g_s} \frac{\varepsilon_0 A V^2}{2[g_0 - (q_1 \sin\theta \pm q_2 \cos\theta)]} \quad (7)$$
$$\approx \frac{\varepsilon_0 A V^2}{2g_0}\left[1 + \frac{q_1\sin\theta \pm q_2\cos\theta}{g_0} + \left(\frac{q_1\sin\theta \pm q_2\cos\theta}{g_0}\right)^2 + L\right]$$

Correspondingly, the electrostatic stiffness matrix $K_e$ is:

$$K_e = \begin{bmatrix} k_{e11} & k_{e12} \\ k_{e21} & k_{e22} \end{bmatrix} = \frac{-\varepsilon_0 A V^2}{g_0^3}\begin{bmatrix} \sin^2\theta & \pm\sin\theta\cos\theta \\ \pm\sin\theta\cos\theta & \cos^2\theta \end{bmatrix} \quad (8)$$

As known, the electrostatic stiffness matrix has non-zero off-diagonal terms that are suitable for quadrature cancellation. In addition, anisotropic-wet-etching is a self-bounded process as it provides precise control of the surface finish and final geometry, which is advantageous for gyroscope fabrication.

According to an embodiment of the present invention, a single-crystal silicon (SCS) pitch/roll gyroscope comprises slanted quadrature electrodes, in which the entire vibrating structure is formed by anisotropic-wet-etching of SCS. The slanted quadrature electrodes provide signals that can be used for quadrature cancellation.

Figure 14:
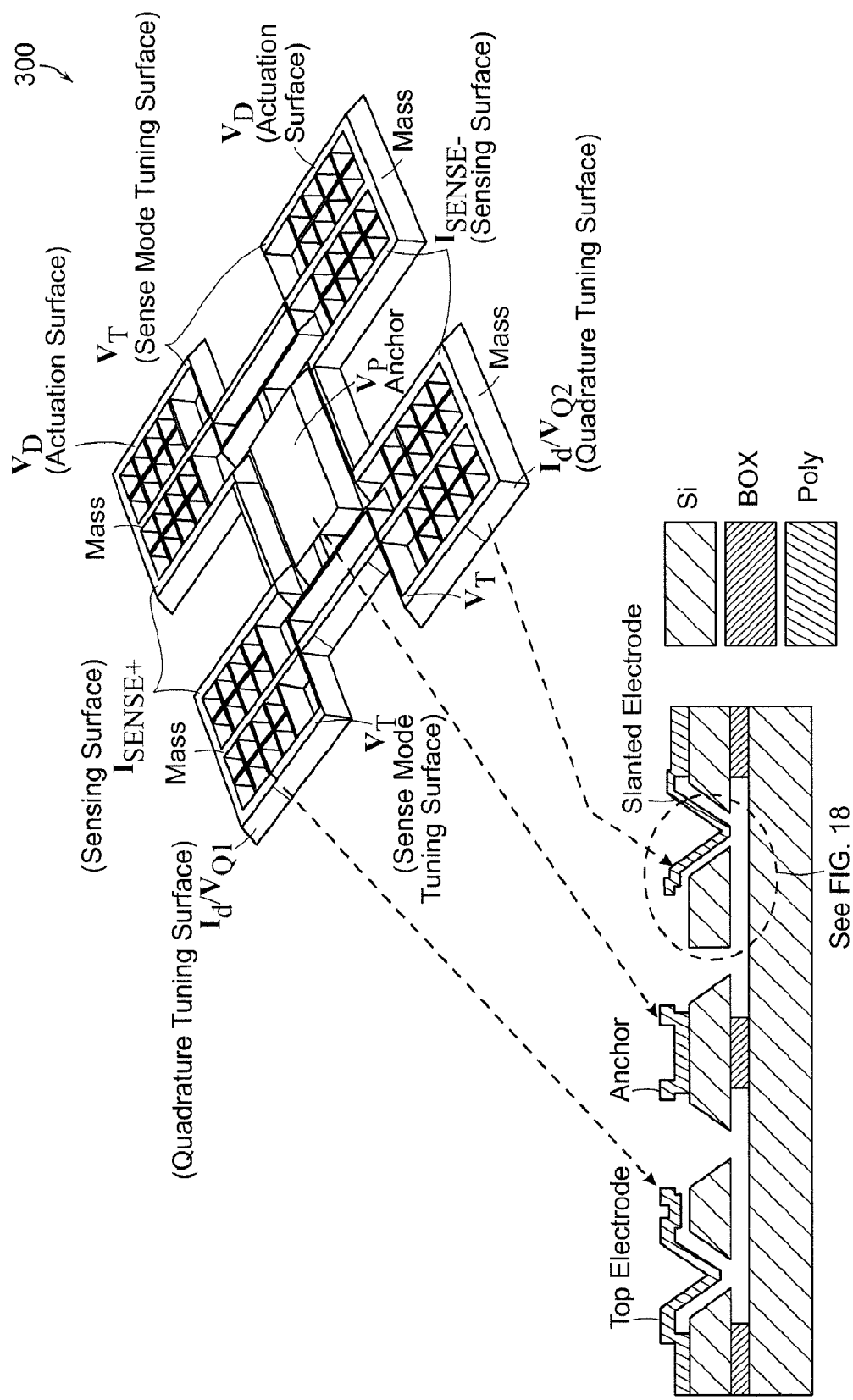
FIG. 14 depicts a cross-section of the resonant structure shown in FIGS. 6 and 7.
Figure 15:
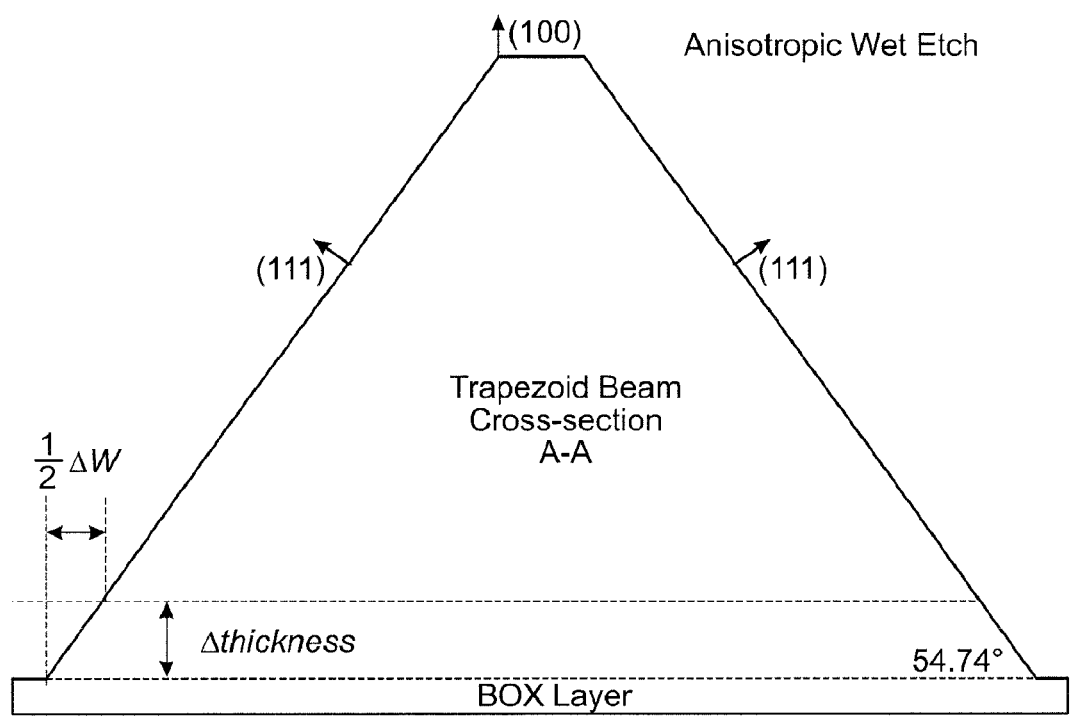
FIG. 15 illustrates conceptually a cross-sectional view of a trapezoid mechanical resonant beam.

The anisotropic-wet-etched gyroscope features an isosceles trapezoid cross-section as shown in FIG. 14 and FIG. 15. The top width of the trapezoid is defined by lithography, whereas the bottom width is determined by both the top width and the thickness of the device, which introduces thickness dependency to the in-plane resonant frequency of the gyroscope. As a result, the in-plane and out-of-plane modes track each other over device thickness variations, making the frequency split thickness insensitive.

Figure 16:
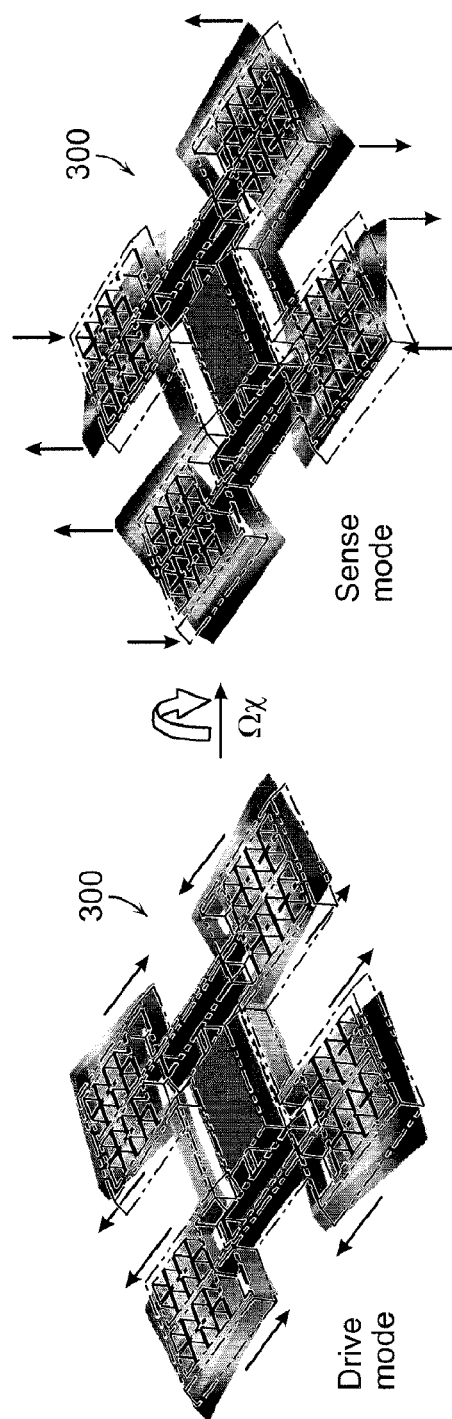
FIG. 16 depicts the drive and sense modes of operation of the resonant structure of FIGS. 6 and 7 in accordance with an embodiment of the present invention.

Referring to FIG. 14, the electrode configuration includes horizontal and slanted electrodes with sub-micron gap sizes that are used for capacitive transduction. The mode shapes of the resonance mass 300 corresponding to the drive and sense modes of operation of the gyroscope are set forth in FIG. 16.

A pair of slanted electrodes, shown in FIG. 14, is used to actuate the in-plane drive mode at 200 kHz while excitation of the out-of-plane sense mode is avoided due to opposite mode symmetry at the electrodes. Another two slanted electrodes are used for drive mode current output and electrostatic quadrature tuning. Horizontal electrodes on top of the device are used for differential sense output and sense mode frequency tuning. The sense mode is designed to have a slightly higher frequency than drive mode to ensure mode-matching capability.

Figure 17:
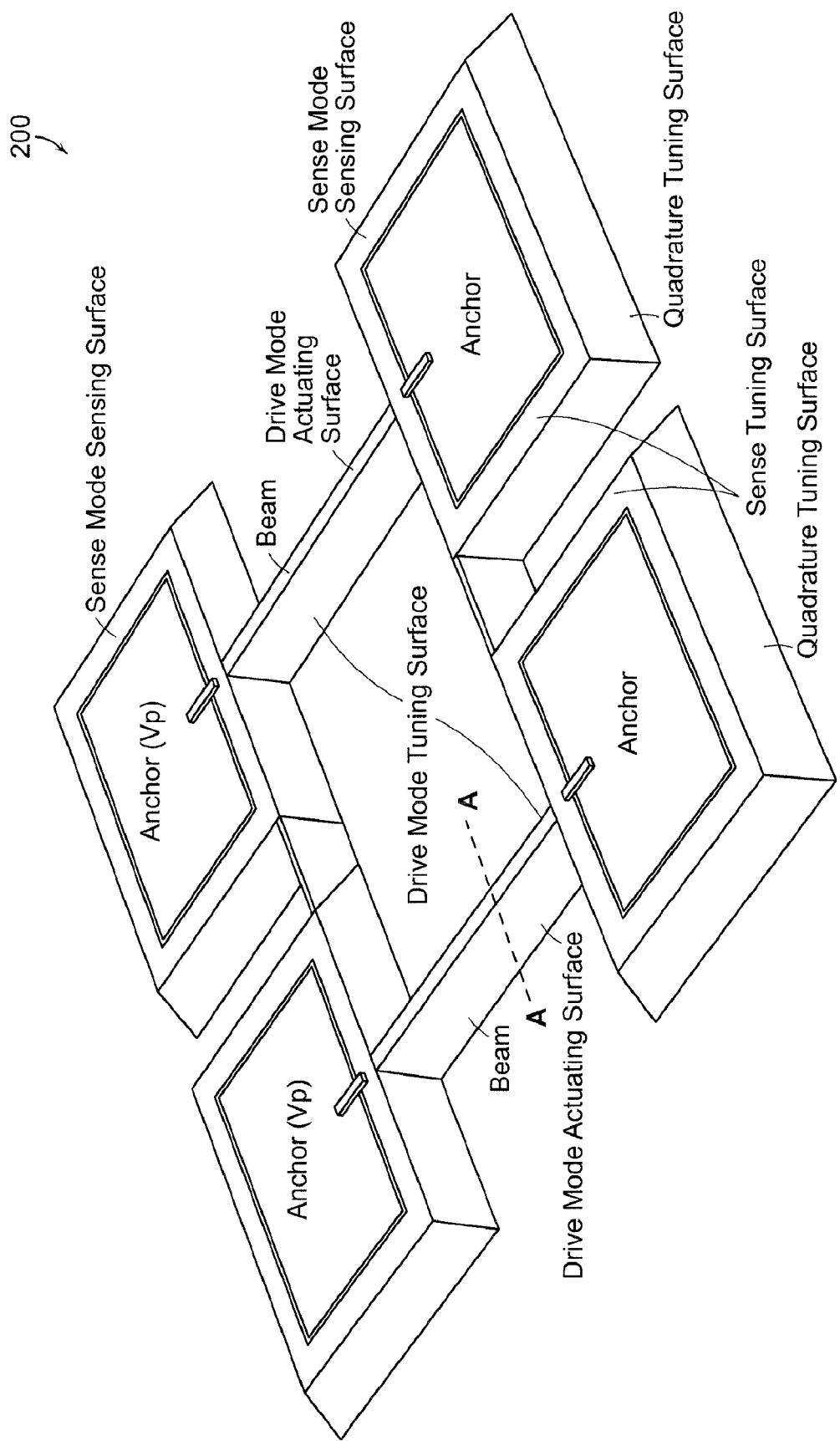
FIG. 17 illustrates conceptually a perspective schematic view of the resonance structure shown in FIGS. 1-6 with capacitive transduction surfaces.
Figure 19A:
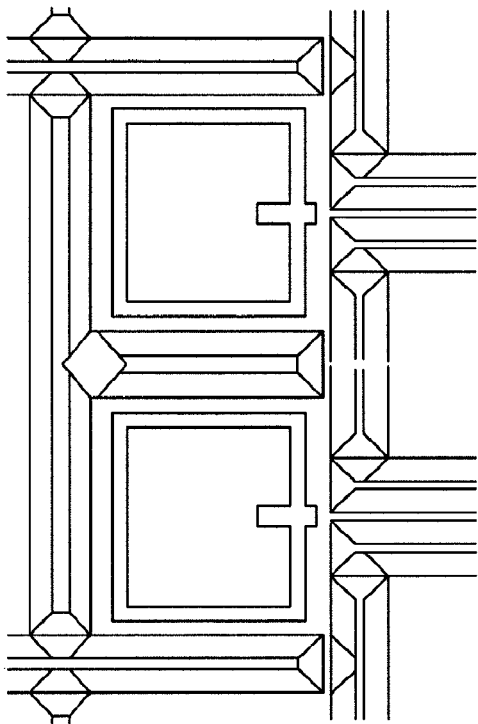
FIG. 19(a) is a top view of trenches after a first wet etching in the manufacturing of the thickness-insensitive gyroscope according to the present disclosure.
Figure 19B:
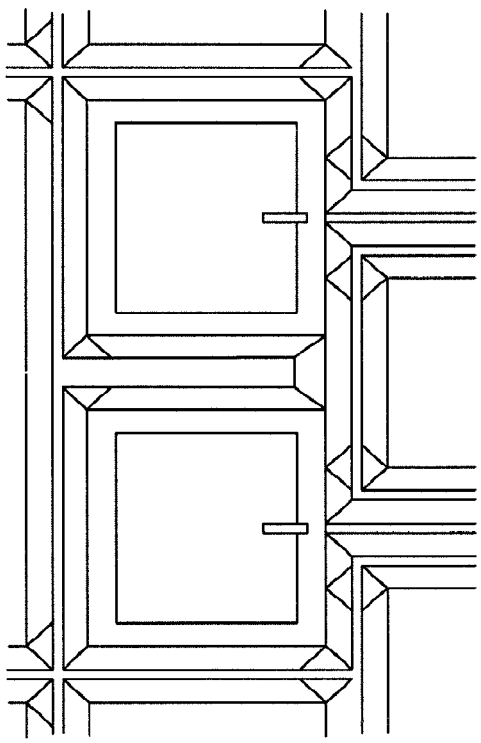
FIG. 19(b) is a Nitride mask with openings near the convex corners of the thickness-insensitive gyroscope.
Figure 19C:
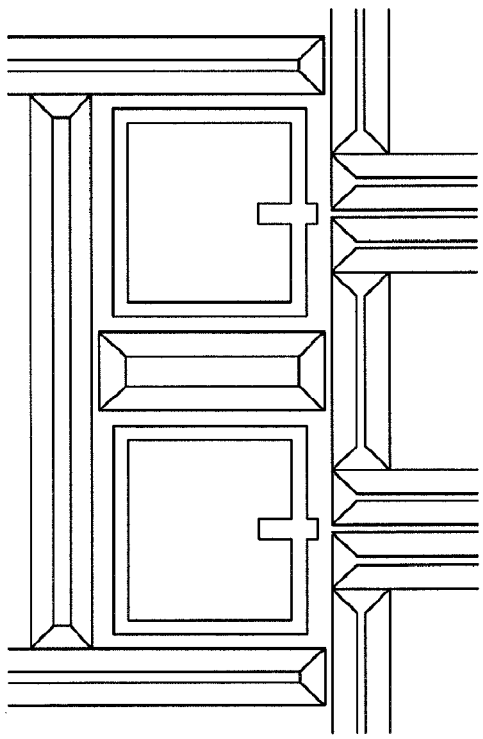
FIG. 19(c) is the thickness-insensitive gyroscope after a second wet etching step.
Figure 19D:
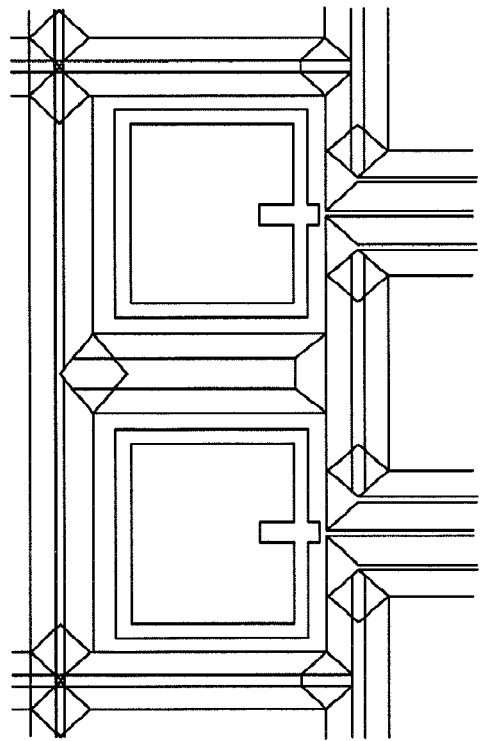
FIG. 19(d) is a top view of the finished trenches of the thickness-insensitive gyroscope in accordance with the present disclosure.

The resonance structure 200, shown in FIG. 17, has an operation frequency of about 300 kHz with resonance structures defined by combined anisotropic wet etching and DRIE, and sense electrodes, drive electrodes and tuning electrodes formed with polysilicon. Generally, in one embodiment, a suspended resonance structure with anchor(s) is surrounded by slanted electrodes, top electrodes, and is some cases vertical electrodes, with capacitive transduction gaps separating the resonance structure and electrodes. The polysilicon electrodes are not shown in FIG. 17 although each electrode is disposed opposite the capacitive transduction face. The locations of the transduction gaps are labeled in FIG. 17 and one of ordinary skill in the art would understand the placement of the electrodes in relation to those gaps based on the discussion herein.

In the disclosed thickness-insensitive gyroscope design, anisotropic wet etching exposes slanted sidewalls. By placing an electrode parallel to the slanted sidewall, the capacitive gaps between the resonance structure and the electrode that are affected by displacement of both modes can be defined, as presented in FIG. 13.

As a non-limiting example, one fabrication process of the resonance structure 300 includes anisotropic-wet-etching. During the anisotropic wet etching, convex corners need to be protected. Accordingly, a known two-mask LOCOS method, for example, Pal et al., "A Novel Process For Perfect Convex Corner Realization In Bulk Micromachining," J. Micromech. Microeng. 14, (2004), pp. 1416-1420, the entire contents of which is incorporated by reference for all purposes, where local oxidation of silicon is used to protect one of the (111) planes, which also provides the convex corner protection, may be used with modifications to eliminate effects of misalignment.

In the self-aligned process, referring to FIGS. 18(a)-18(e), the entire gyroscope pattern is defined on a first thick nitride mask layer. A second thin nitride layer partially covers the pattern and avoids the exposure of convex corners in the first wet etching. The thin nitride mask has irregular-shape openings and wet etching undercuts the thin nitride and forms trenches aligned to the thick nitride mask. As a result, any small misalignments between the two nitride masks will not affect the final device geometry. A local oxidation and a second wet-etching step is performed after the first wet-etching, forming the final SCS structures with intact convex corners. After the device geometry is defined, polysilicon and sacrificial oxide surface micro-machining steps are used to form horizontal and slanted electrodes with sub-micro gaps.

Referring now to FIG. 18(a), a thick LPCVD nitride layer is deposited and patterned to define trench shapes and a thin LPCVD nitride layer is deposited and patterned to form self-aligned openings and then a first KOH wet-etching step is performed. Next, FIG. 18(b), wet oxidation of SCS to form thick thermal oxide for (111) sidewall protection is performed and the nitride layer is blank etched using RIE to remove the thin nitride layer and then a second KOH wet-etching step is performed. As shown in FIG. 18(c), the nitride and oxide layers are removed, tetraethyl orthosilicate (TEOS) is deposited and patterned and a wet oxidation step is performed to form a sacrificial thin oxide. The thin oxide is then patterned and then LPCVD poly-silicon is deposited and patterned as shown in FIG. 18(d). Finally, the device is released in an HF solution and dried with a supercritical dryer, referring to FIG. 18(e).

The manufacturing and fabrication processes described herein may be utilized to manufacture an inertial measurement MEMS semiconductor apparatus comprising a single resonator mass capable of sensing rotation about multiple axes of rotation relative to the apparatus, such apparatus may have a portion thereof with a cross-section as illustrated in FIG. 15.

The resonance structure 200 of the thickness-insensitive gyroscope may be defined by combined KOH wet etching and DRIE on the device layer of an SOI wafer. The anchor tethers can be formed by either wet etching or DRIE and electrodes are formed by polysilicon with capacitive gaps defined by sacrificial oxide layers. A pre-etch step is used for precise crystal alignment as is known in the art. Wet-etching mask is patterned with proper alignment to the crystal orientation and then anisotropic wet etching is performed. A set of masks is used to achieve self-alignment of DRIE and wet etching patterns. First, a nitride hard mask is patterned with both DRIE and wet etching patterns, then the wet etching pattern is covered with PECVD oxide and the DRIE process is performed. After DRIE, the trenches are refilled with TEOS and closed with another layer of nitride. The PECVD oxide is then removed and wet etching is performed.

In anisotropic wet etching, undercut occurs at convex corners. In order to avoid convex corner undercut and obtain the desired geometry, certain convex corner protection is needed. J. W. Kwon and E. S. Kim, in "Multi-Level Microfluidic Channel Routing With Protected Convex Corners," Sensors and Actuators A: Physical, vol. 97-98, 1 Apr. 2002, pp. 729-733, incorporated by reference in its entirety for all purposes, introduced a convex corner protection method where a two-step etching procedure is used, with an additional nitride layer protecting one of the (111) planes at the convex corner before the formation of the convex corner. Perfect convex corners have been achieved with the Kwon, et al. method.

In order to minimize the influence of mask misalignment, a modified convex corner protection method is disclosed. In this method, both horizontal and vertical trenches are etched in the same wet etching step. At the crossing locations, however, a small portion of silicon is preserved to avoid the exposure of convex corners. A layer of nitride is deposited after the first wet etching to protect all exposed (111) planes. Then the nitride is patterned with openings where a convex corner needs to be formed. The final dimension is determined by the top width of the openings as shown in FIGS. 19(a)-19(d). In this method, misalignment between the two masks will only cause a small shift near the convex corner and the major part of the trenches will not be affected.

After the wet-etching step, a thick oxide mask layer is deposited and patterned to surfaces intended for capacitive transduction. A thermal oxide layer is then grown as a sacrificial layer that defines the capacitive gap size between the resonance structure and the electrodes. A polysilicon layer is deposited and patterned to form the actual electrodes. At last, the device is released in HF.

It will be obvious to those reasonably skilled in the arts that the techniques disclosed herein may be similarly applied to the design, manufacture and fabrication of other semiconductor devices given the disclosure contained herein.

The present disclosure is illustratively described above in reference to the disclosed embodiments. Various modifications and changes may be made to the disclosed embodiments by persons skilled in the art without departing from the scope of the present disclosure as defined in the appended claims.

What is claimed is:

1. An article of manufacture comprising a resonant mass formed of a semiconductor material and defining a plurality of rectangular sections interconnected by a plurality of mechanically deformable beams, at least one of the deformable beams having a trapezoidal cross-sectional shape along a length portion thereof, at least one of the rectangular sections having a perimeter at least partially defined by a sidewall slanted at a first angular value relative to a first plane in which the resonant mass exists, and at least one electrode having a portion disposed parallel the slanted sidewall and separated therefrom by a capacitive gap.

2. The article of manufacture of claim 1, wherein the at least one deformable beam has the cross-sectional shape of an isosceles trapezoid along the length portion thereof.

3. The article of manufacture of claim 1, wherein the at least one deformable beam is formed by anisotropic wet etching of single crystal silicon.

4. The article of manufacture of claim 1, wherein the at least one deformable beam has an isosceles trapezoid cross-section shape along the length portion thereof.

5. The article of manufacture of claim 1, further comprising:
a plurality of electrodes disposed adjacent the resonant mass and separated therefrom by a capacitive transduction gap,
wherein at least one electrode is disposed along a slanted surface of the resonant mass.

6. The article of manufacture of claim 1, further comprising:
a plurality of anchors, each anchor of the plurality of anchors configured for coupling a respective one of the plurality of rectangular sections of the resonant mass to a substrate.

7. The article of manufacture of claim 1, wherein the at least one electrode further comprises a horizontal portion parallel to the first plane in which the resonant mass exists.

* * * * *